Figure 1:
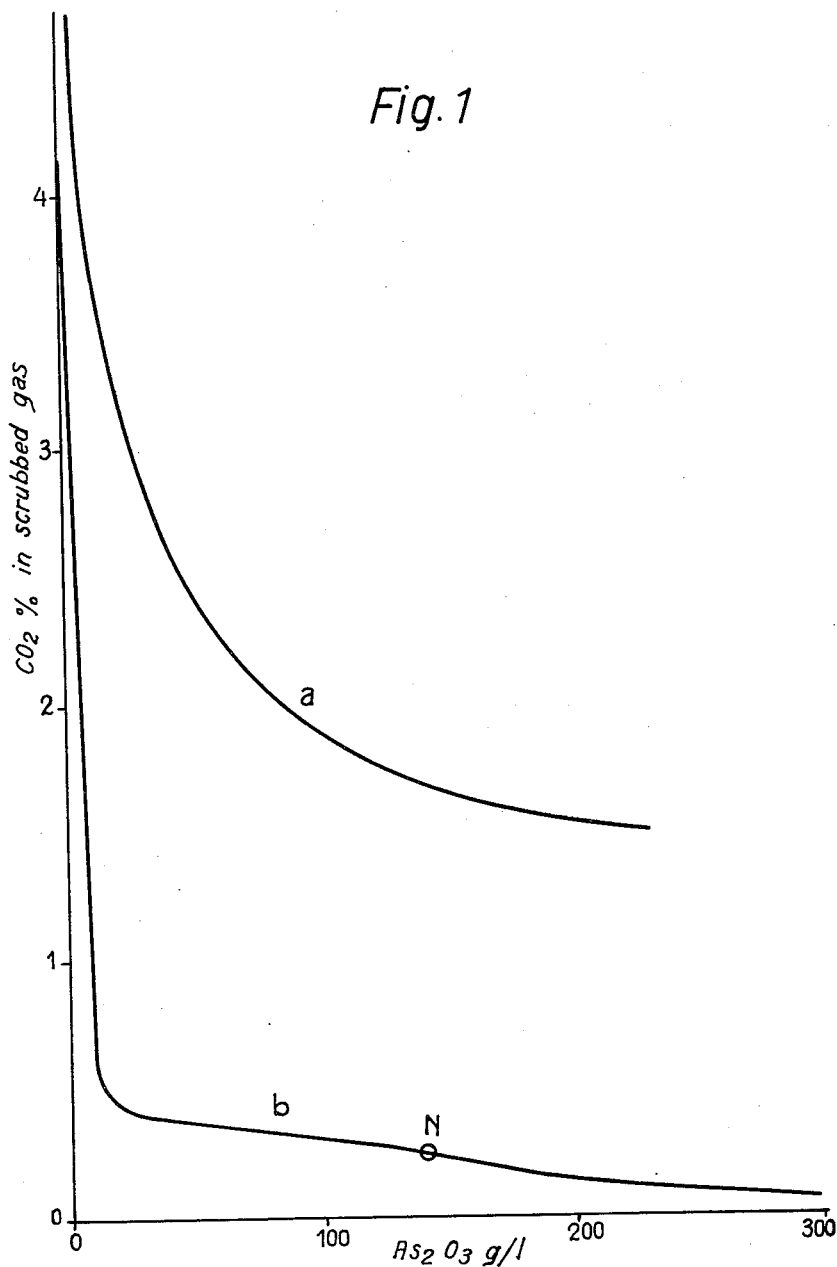

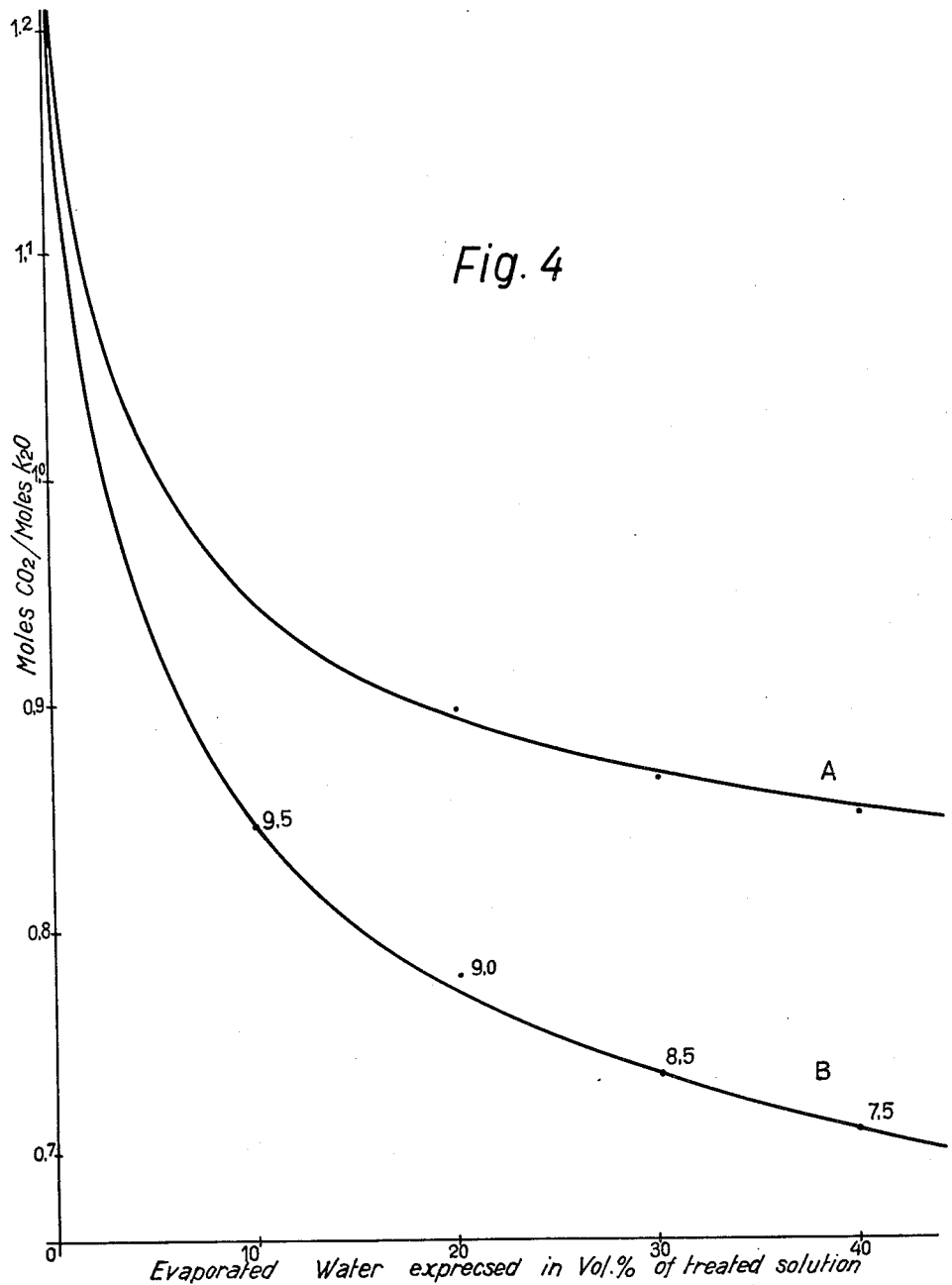

United States Patent Office 3,037,844
Patented June 5, 1962

3,037,844
METHOD OF SEPARATING AND RECOVERING CARBON DIOXIDE FROM GASEOUS MIXTURES
Giuseppe Giammarco, Porto Marghera, Venice, Italy, assignor to S.p.A. Vetrocoke, Turin, Italy
Filed Oct. 22, 1958, Ser. No. 768,996
Claims priority, application Italy Dec. 6, 1954
11 Claims. (Cl. 23—150)

This invention concerns a method of separating and recovering carbon dioxide from gaseous mixtures by means of an absorbing solution.

This is a continuation-in-part of application Serial No. 551,411, filed December 6, 1955.

It is known that absorption of carbon dioxide from gaseous mixtures is usually carried out at the present state of the art by means of alkaline mineral solutions, among which the best known ones are solutions of carbonates, phosphates, borates, phenolates and the like of alkaline metals or ammonium, which are cycled between an absorption step and a regeneration step in the hot, in which the absorbed carbon dioxide is expelled.

These alkaline mineral solutions are objectionable in that they oppose a considerable resistance to the transfer of carbon dioxide from a gaseous to a liquid phase and vice versa, which necessitates large-sized plants and implies a considerable heat consumption in the cycle. It is further known in this connection that a large number of the research scientists had attempted at obviating the above-mentioned drawback by admixing the alkaline mineral solutions with various substances such as glycol, glycerine, glucose, dextrose, phosphates, and amides. However, hardly any results of industrial importance were achieved.

The above-mentioned alkaline mineral solutions are further objectionable in that they remove $CO_2$ in a coarse and less complete manner than, for instance, solutions of ethanol-amines and ammoniacal solutions, more particularly at high temperature, the absorbing efficiency being moreover generally low.

The object of the improved method is to carry out absorption of carbon dioxide from gaseous mixtures by using a novel type of alkaline mineral solution possessing a much higher absorbing efficiency than solutions heretofore employed and even solutions of ethanolamines.

The further object is to carry out a fine or thorough purification from carbon dioxide though operating at high temperatures.

A further object is to materially reduce the heat consumption in the cycle and utilize dead heats available at low temperature.

A further object is to recover the absorbed carbon dioxide in concentrated form directly under pressure free from $H_2S$.

A further object is to maintain the absorbing efficiency of the solution unaltered by removing therefrom any compounds detrimentally affecting its efficiency.

A further object is to provide a solution which is not corrosive with respect to ferrous materials though operating at high temperature.

In order to achieve the above-mentioned objects this method employs the usual solutions of carbonates of alkaline metals (Na, K, $NH_4$) employed heretofore by industry, and activates said solutions and improves their absorbing efficiency by the presence in operational conditions of arsenious anhydride ($As_2O_3$). In addition to solutions of alkaline carbonates, solutions of phosphates, borates, phenolates and the like, which are likewise alkaline, can be employed in connection with which it is recalled that in the presence of carbon dioxide to be absorbed said solutions are constituted and behave like alkaline carbonate solutions with respect to which they moreover contain the phosphoric, boric, phenic ions etc. The presence of arsenious anhydride in the solution should be understood to include also the presence of alkaline salts, arsenite and meta-arsenites which arsenious anhydride tends to form with the alkali contained in the solution and, generally, the presence of the ion of arsenious acid. The solution can be totally constituted by alkaline arsenite.

The activating effect of the presence of arsenious anhydride, as defined above, was ascertained as a result of lengthy experimental work.

Figure 2:
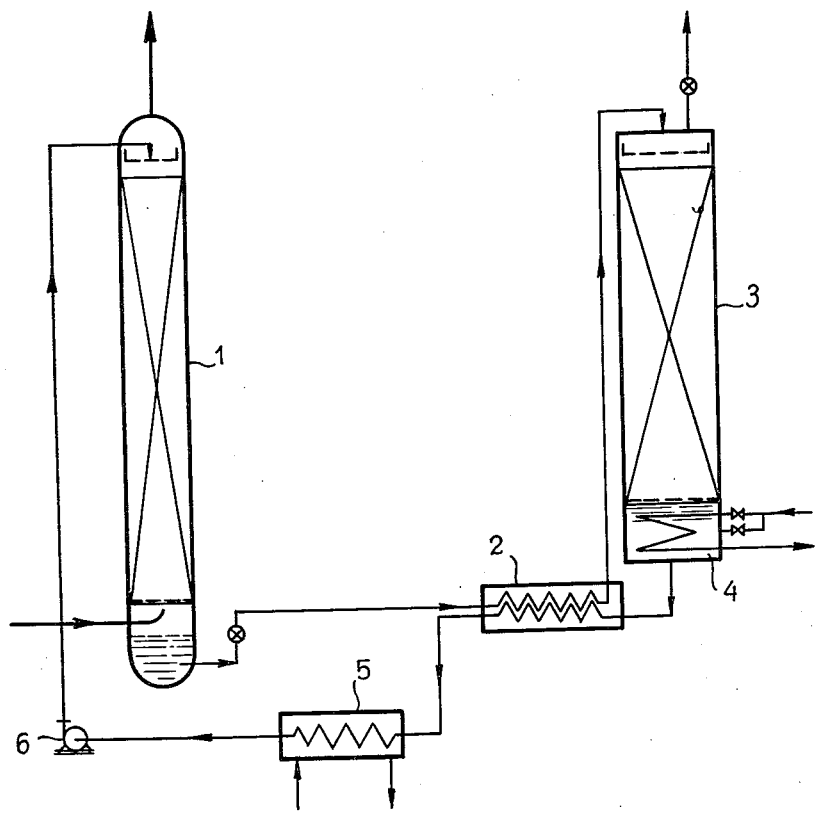

For this purpose a pilot plant was employed comprising an absorption column and a regeneration column in which the absorbed carbon dioxide was expelled in the hot by the conventional method (FIGURE 2). A first set of experiments refers to scrubbing at amospheric pressure and 75° C. of a gaseous mixture containing 10% carbon dioxide by employing a solution of 170 g./l. sodium carbonate, utilized at first in a pure condition and subsequently with gradually increasing arsenious anhydride contents. The various experiments were carried out keeping all conditions constant and merely varying the arsenious anhydride content which, as mentioned above, was gradually increased. On reaching the operational conditions on each test, the residual carbon dioxide contained in the gaseous mixture leaving the absorption column was measured. The results of this first set of experiments are summarized by curve $a$ in the diagram shown in FIGURE 1, in which the abscissae indicate the g./l. arsenious anhydride concentration in the solution, and the ordinates indicate the carbon dioxide percentage by volume in the gaseous mixture leaving the scrubbing step.

A further set of experiments were carried out identically but by effecting absorption at a pressure of 12 atm. and 75° C. and employing a gaseous mixture containing 25% carbon dioxide and a solution of 294 g./l. potassium carbonate, utilized at first in a pure condition and subsequently with gradually increasing arsenious anhydride contents. The results of the latter set of experiments are summarized by curve $b$ in the diagram shown by FIGURE 1.

It will be noted generally that the presence under operational conditions of arsenious anhydride in the absorbing solutions markedly improves absorption. In fact, it was ascertained that removal of carbon dioxide is very crude when pure carbonate solutions are employed, while it is materially improved as the solution becomes richer in arsenious anhydride.

More particularly, it is noted that the activating power of arsenious anhydride is not proportional to the quantity of arsenious anhydride which is present, but is highly effective even with small concentrations and effectiveness increases as concentrations rise with a gradually lower increment, maximum effectiveness being actually reached when arsenious anhydride is in a quantity stoichiometrically corresponding to the formation of ortho-arsenite ($M_3AsO_3$), for instance at point N on curve $b$. The increment in absorbing power is industrially negligible with higher contents corresponding to the formation of meta-arsenite ($MAsO_2$) or over and above such contents. Moreover, it will be seen that curbe $b$ relating to experiments carried out under the pressure is steeper than curve $a$ relating to experiments carried out at atmospheric pressure, which means that the activating power of arsenious anhydride is higher when operating under pressure.

It will be clear from the above that the quantity of arsenious anhydride contained in the alkaline carbonate solutions is variable within wide limits. Consequently, in connection with the improved method, instead of solutions of alkaline carbonates activated by the presence of arsenious anhydride, solutions of alkaline arsenites may be immaterially referred to, this equalling the provision of a novel type of absorbing solution.

The property of arsenious anhydride ascertained as above of improving a cyclic method of absorbing and expelling $CO_2$ is probably due to the fact that arsenious anhydride, the amphoteric character of which is known, improves exchange of $CO_2$ between its gaseous and liquid phase and vice versa, thereby decreasing the resistance opposed by the liquid film probably through the intervention of speedier part reaction. Probably, moreover, the acid character of arsenious anhydride chemically furthers expelling of $CO_2$ during the regeneration step, whereby more thoroughly regenerated solutions are obtained which are better suited for a more effective and rapid absorption of $CO_2$.

Apart from the above explanations, the following important properties of the alkaline arsenite solution were practically ascertained: (1) their $CO_2$ absorbing power is theoretically twice the absorbing power of carbonates, on account of the fact that in order to be converted to bicarbonates, carbonates absorb at the utmost 1 mol $CO_2$/1 mol alkaline oxide ($M_2O$), while arsenites are at first converted to carbonates, next to bicarbonates absorbing 2 mol $CO_2$ to each mol alkaline oxide ($M_2O$) while $As_2O_3$ is displaced by $CO_2$; (2) regeneration of the exhausted absorbing solutions in an industrial cycle was found to be rapid and to require a considerably reduced heat consumption over alkaline carbonate solutions; $CO_2$ is easily expelled at the regeneration step so that it becomes possible, preferably from an economical standpoint, to regenerate the exhausted solutions by expelling $CO_2$ instead of the conventional method of boiling, simply by treating the solution in direct contact with gases, with the particular properties of arsenite solutions temperatures of the order of 65–75° C. being sufficient in this case only and an industrially satisfactory regeneration being achieved advantageously utilizing dead or lost heat; (4) arsenite solutions distinguish by $CO_2$ partial pressures considerably lower than those of carbonates, so that a fine much more effective purification from $CO_2$ can be obtained with respect to alkaline carbonates; (5) on account of the low vapor pressures even at high temperatures the use of arsenite solutions affords a fine purification even with absorbing temperatures near or exceeding the boiling temperatures of the solution at atmospheric pressure, at which ordinary solutions heretofore employed by industry did not prove satisfactory; (6) as distinct from carbonate solutions, arsenite solutions are not in the least corrosive with respect to ferrous materials even at high temperatures, no corrosion having been ascertained in any of the industrial plants in which they were employed even after prolonged use.

Evidence of the above statements is supplied by the results of a run of a semi-industrial plant mainly comprising an absorption power 15 meters in useful height, 0.4 m. diameter, and a regeneration tower 15 m. in useful height and 0.6 m. diameter filled with 25 x 25 Raschig rings. This plant was utilized for two fundamental sets of experiments.

The first set of experiments was carried out along the conventional diagram shown in FIGURE 2, the exhausted solution from the absorption tower 1 flowing through a heat exchanger 2 in countercurrent with the regenerated hot solution, which heated the former to about 94–95° C. The solution was fed from the top to the regeneration tower 3, at the bottom of which it was heated to boiling temperature by means of indirect heat exchange with steam in the coil 4. The regenerated solution leaving the regeneration tower 3 yielded its heat in the above-mentioned heat exchanger 2, then flowed through a water cooler 5 which brought its temperature during such tests to around 55–65° C., the solution was then drawn by the pump 6 and returned to the absorption tower 1. During the tests the tower 1 had been equipped in addition to the cocks for analyzing the gas at the inlet and outlet with four intermediate cocks (A, B, C. D) equally spaced through which the progress of absorption could be checked. The tests were carried out at a pressure of 11 atm. employing at first a potassium carbonate solution, next an arsenite solution having the same $K_2O$ content, the gaseous mixture supply being gradually increased.

When testing with pure potassium carbonate circulation of the solution was adjusted to absorb 15–16 $Nm.^3 CO_2/m.^3$ solution; when utilizing arsenite solutions circulation of the solution was adjusted to absorb 21–28 $Nm.^3 CO_2/m.^3$ solution, in order to demonstrate the above statement (1). In both cases the heat supply was 50 kg. steam per $m.^3$ solution, further conditions being left unaltered.

The results are shown in the following Table 1.

*Table 1*

POTASSIUM CARBONATE SOLUTION CONTAINING 200 g./l. $K_2O$

| Gas supply, $Nm.^3/h.$ | Solution supply, $m.^3/h.$ | Analyses of $CO_2$, percent by volume | | | | | | $Nm^3$ absorbed $CO_2/m.^3$ solution | Abs. $CO_2$ mol./mol. $K_2O$ | $CO_2$ mol./ $K_2O$ mol. ratio in regenerated solution |
|---|---|---|---|---|---|---|---|---|---|---|
| | | Inlet | A | B | C | D | Outlet | | | |
| 200 | 1.9 | 16.4 | 10.8 | 7.0 | 3.7 | 1.8 | 1.0 | 16.5 | 0.35 | 1.28 |
| 400 | 3.7 | 17.8 | 13.6 | 10.4 | 7.2 | 4.8 | 3.9 | 15.7 | 0.33 | 1.36 |

POTASSIUM ARSENITE SOLUTION CONTAINING 200 g./l. $K_2O$ AND 140 g./l. $As_2O_3$

| Gas supply, $Nm.^3/h.$ | Solution supply, $m.^3/h.$ | Inlet | A | B | C | D | Outlet | $Nm^3$ absorbed $CO_2/m.^3$ solution | Abs. $CO_2$ mol./mol. $K_2O$ | $CO_2$ mol./ $K_2O$ mol. ratio in regenerated solution |
|---|---|---|---|---|---|---|---|---|---|---|
| 200 | 1.65 | 17.4 | 1.9 | | 0.06 | | 0.05 | 21 | 0.45 | 1.00 |
| 300 | 1.95 | 17.8 | 6.4 | | 0.20 | 0.15 | 0.10 | 27.5 | 0.59 | 1.06 |
| 400 | 2.50 | 16.4 | 8.2 | | 0.55 | 0.15 | 0.10 | 25.5 | 0.55 | 1.15 |
| 500 | 3.60 | 18.2 | 10.2 | | 0.80 | 0.25 | 0.20 | 25 | 0.54 | 1.13 |
| 600 | 3.95 | 15.4 | 6.4 | 1.35 | 0.40 | 0.25 | 0.20 | 23.3 | 0.50 | 1.03 |
| 800 | 5.40 | 16.4 | 9.2 | 3.20 | 0.95 | 0.45 | 0.40 | 23.9 | 9.51 | 1.15 |
| 1,000 | 6.15 | 17.4 | 15.4 | 10.6 | 1.95 | 0.50 | 0 40 | 28 | 0.60 | 1.10 |

The difference in behavior between pure carbonate and arsenite solutions is a considerable one. It is noted that the plant operated by arsenite solutions with a gas supply of 1000 $Nm.^3/h.$ removes $CO_2$ to a 0.4% content on issue with a specific charge of 28 $Nm.^3/CO_2$ per $m.^3$ solution, while the pure potassium solution with plant handling of 200 $Nm.^3/h.$ gas only removes $CO_2$ to 1% content on issue with a specific charge of 16.5 $Nm.^3$ $CO_2/m.^3$ solution, which shows that the arsenite solution is industrially more effective by at least 5 times the carbonate solution considering the gas supply only, but is certainly still more effective, probably nearly 10 times as effective, when considering the improved purification only.

Arsenite affords moreover a fine purification (compare in this connection the run with the 200 $Nm.^3/h.$ gas in which arsenite purifies gas down to 0.05% residual $CO_2$ and carbonate to 1%), removal of $CO_2$ occurs with arsenite at much higher speed and in a smaller space than when using carbonate solutions, as will be clear from intermediate analyses along the tower.

The extent of regeneration of this solution expressed as the $CO_2$ mol/$K_2O$ mol ratio in the solution is with arsenite considerably better than with potassium carbonate, the moles of $CO_2$ absorbed by each mole of alkaline oxide being in the case of arsenite considerably higher in number than with pure potassium carbonate.

The property of arsenite solutions of finely absorbing $CO_2$ to low residual values and of carrying out such absorption at high speed depends upon the fact that said arsenite solutions possess $CO_2$ vapor partial pressures considerably lower than carbonate solutions. For instance, an arsenite solution containing 200 g./l. $K_2O$ and 150 g./l. $As_2O_3$ and regeneration conditions normally existing in an industrial plant, that is with a $CO_2/K_2O$ molar ratio of about 0.8 to 1 exhibits at various temperatures vapor pressures approximately of the order indicated in Table 2 expressed in mercury mm. At the same temperatures pure carbonate solution of the same concentration equalling 200 g./l. $K_2O$ and in a regenerated condition, as ordinarily obtained in industrial plants to contents of 30–40% bicarbonate, that is, a $CO_2/K_2O$ molar ratio=1.3–1.4 exhibits, according to the data supplied by technical literature, the following pressures indicated in Table 2.

*Table 2*

| Temperatures, °C. | Arsenite solution containing $K_2O$=200 g./l. and $As_2O_3$=150 g./l. | | | Carbonate solution containing $K_2O$=200 g./l. | |
|---|---|---|---|---|---|
| | $CO_2/K_2O$ molar ratio | | | $CO_2/K_2O$ molar ratio | |
| | 0.801 | 0.99 | 1.05 | 1.304 | 1.42 |
| 50 | 0.765 | | 8.05 | 11.05 | 25.3 |
| 60 | | 4.13 | 13.80 | 11.95 | 34.2 |
| 70 | 1.34 | 8.60 | 20.10 | 20.4 | 46.6 |
| 80 | 2.10 | | 27.50 | 29.4 | 67.2 |
| 90 | 3.20 | 15.10 | | 46.8 | 107.0 |

It will be seen from the values in the above table that the $CO_2$ vapor pressures of arsenite solutions are much lower than the corresponding vapor pressures of the carbonate solutions, so that arsenite solutions afford a purification from $CO_2$ which is industrially satisfactory and fine even at high temperatures near and even exceeding the boiling point. In order to industrially demonstrate this property the plant was run at a pressure of 11 atm. with arsenite solutions of the following composition: 200 g./l. $K_2O$ and 140 g./l. $As_2O_3$, a gas supply of 1000 Nm.³/h. and a specific charge of 60–30 Nm.³$CO_2$/m.³ solution at temperatures increasing up to 105° C. with the results summarized in Table 3 which shows that even with a considerable gas supply to the plant the arsenite solution retains the property of purifying from $CO_2$ to an industrially satisfactory extent even at a temperature of 105° C. at super-atmospheric pressure.

*Table 3*

POTASSIUM ARSENITE SOLUTION CONTAINING $K_2O$ 200 g./l. AND $As_2O_3$ 140 g./l.

| Gas supply, Nm³/h | Solution supply, m.³/h. | Absorption temperature, °C. | Analysis of $CO_2$, percent by volume | | | | | | Absorbed $CO_2$ Nm.³/m.³ solution | Absorbed $CO_2$ mol./$K_2O$ mol. | $CO_2/K_2O$ molar ratio in the regen. sol. |
|---|---|---|---|---|---|---|---|---|---|---|---|
| | | | Inlet | A | B | C | D | Outlet | | | |
| 1,000 | 6.15 | 75 | 18.4 | 10.2 | 3.85 | 0.3 | | 0.20 | 30.0 | 0.63 | 0.97 |
| 1,000 | 6.15 | 95 | 17.4 | 11.2 | 3.40 | 0.7 | | 0.40 | 28.5 | 0.60 | 0.95 |
| 1,000 | 6.15 | 105 | 16.8 | 14.6 | 9.0 | 3.4 | | 0.70 | 26.2 | 0.55 | 0.99 |

It was moreover ascertained that arsenite solutions are more effective than ethanolamine solutions. For it was found that on purifying a gaseous mixture by means of 20% triethanolamine solution to obtain 2% $CO_2$ at the outlet, on admixing sodium meta-arsenite by an extent of 20 g./l. expressed as $As_2O_3$ operating under the same conditions the $CO_2$ content was lowered to 0.8–1%.

Figure 3:
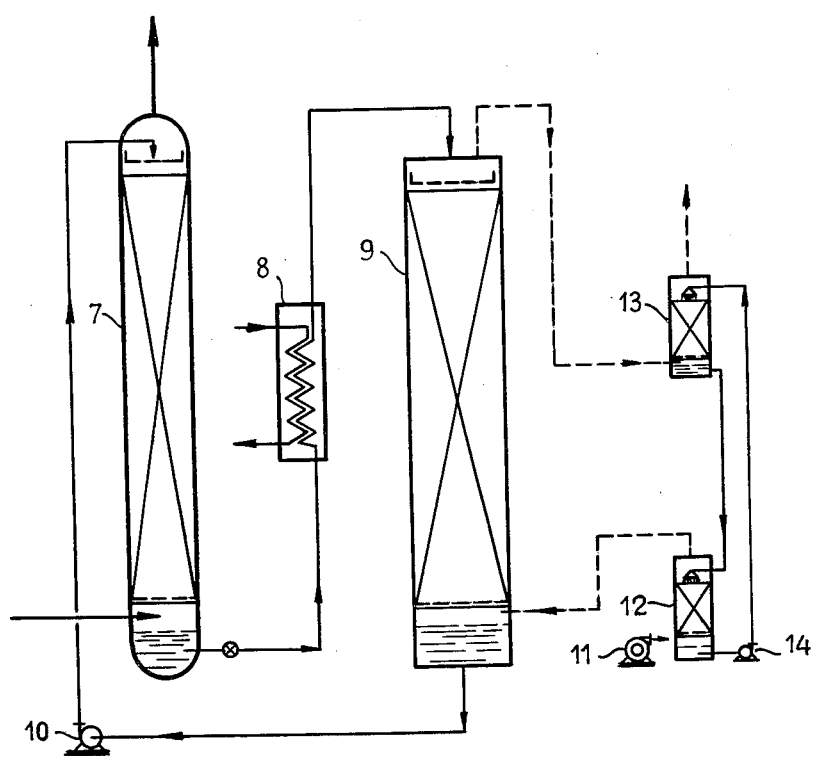

A second set of experiments was carried out in order to demonstrate the above statements that is, that arsenite solutions can be conveniently regenerated at temperatures below the boiling temperature at atmospheric pressure simply by treating the solution in direct contact with desorbing gases and considerable reduction of heat consumption. The semi-industrial plant referred to above was equipped as shown in FIGURE 3.

The exhausted solution from absorption was heated by supplying external heat and conveyed to the regeneration tower, into the bottom of which air was blown in order to regenerate the solution. The solution was returned by a pump directly to the absorption tower.

During the tests carried out at a pressure of 11 atm. the circulation of the solution was adjusted to a specific charge ranging between 11 and 15 Nm.³ $CO_2$/m.³ solution with pure potassium carbonate and 20–30 Nm.³ $CO_2$/m.³ solution with the arsenite solution.

The results are set out in Table 4.

*Table 4*

POTASSIUM CARGONATE SOLUTION CONTAINING 200 g./l. $K_2O$

| Gas supply Nm.³/h. | Solution supply m.³/h. | Temperature | | Analyses of $CO_2$, percent by volume | | | | | | Absorbed $CO_2$ Nm.³/m.³sol. | Absorbed $CO_2$ mol/$K_2O$ mol. | $CO_2/K_2O$ molar ratio in the reg. sol. |
|---|---|---|---|---|---|---|---|---|---|---|---|---|
| | | absorption | regen. | Inlet | A | B | C | D | Outlet | | | |
| 200 | 1.8 | 60 | 75 | 18.6 | 14.6 | 12.8 | 9.0 | 5.8 | 5.4 | 15.1 | 0.320 | 1.53 |
| 400 | 3.7 | 60 | 75 | 18.0 | 16.0 | 14.2 | 11.8 | 8.6 | 8.0 | 11.7 | 0.248 | 1.58 |

POTASSIUM ARSENITE SOLUTION CONTAINING 200 g./l. $K_2O$ AND 140 g./l. $As_2O_3$

| 200 | 1.9 | 60 | 75 | 17.2 | | 0.70 | 0.45 | 0.15 | 0.14 | 18.0 | 0.38 | 1.04 |
| 300 | 1.9 | 60 | 75 | 19.4 | | 4.10 | 0.70 | 0.50 | 0.25 | 30.3 | 0.64 | 1.08 |
| 400 | 4.0 | 60 | 75 | 22.8 | 1.50 | 1.10 | 0.45 | 0.30 | 0.30 | 22.5 | 0.47 | 1.16 |
| 500 | 4.0 | 60 | 70 | 22.0 | 13.4 | 6.60 | 2.40 | 1.40 | 0.60 | 26.8 | 0.56 | |
| 600 | 4.5 | 60 | 76 | 22.2 | 8.4 | | 1.50 | 0.60 | 0.55 | 28.8 | 0.61 | 1.18 |
| 750 | 6.0 | 60 | 75 | 21.8 | | | 1.60 | 1.10 | 0.80 | 26.2 | 0.55 | 1.19 |
| 1050 | 8.5 | 60 | 65 | 18.2 | 6.0 | 5.2 | 3.60 | 2.30 | 2.20 | 20.0 | 0.42 | 1.31 |

Regeneration in a stream of gas or air by means of solutions heated to 75° C. only, in order to utilize heat of low thermal level only, that is inexpensive heat, does not yield industrially satisfactory results with pure carbonate solutions while with arsenite it affords a fine $CO_2$ removal below 0.15% $CO_2$ as with the run on 200 Nm.³/h. gas, which is always industrially satisfactory. On the run on 1050 Nm.³/h. gas and $CO_2$ removal to 2.20% the difference in temperature is merely 5° C. in the absorption and regeneration steps, the purification being acceptable when treating city gas.

The above satisfactory results of a plant operated on an arsenite solution and with regeneration at low temperature by blowing in air were ascertained also by another set of experiments carried out on a semi-industrial plant, which checked the progress of the process at pressures of the order of 70 atm. The reuslts are set out in the following Table 5.

*Table 5*

| Gas supply, Nm.³/h. | Sol. supply, m.³/h. | Temperatures, °C. | | $CO_2$ Percent Analysis by volume | | | | | | Analysis of solution | | Absorb. Nm.³ $CO_2$/ m.³ sol. | $CO_2/K_2O$ molar ratio in the reg. sol. |
|---|---|---|---|---|---|---|---|---|---|---|---|---|---|
| | | abs. | reg. | Inlet | A | B | C | D | Outlet | $K_2O$, g./l. | $As_2O_3$, g./l. | | |
| 230 | 2.0 | 71 | 78 | 28.2 | 20.2 | 8.2 | 3.0 | 1.35 | 0.5 | 219 | 159 | 32 | 1.27 |
| 210 | 2.1 | 78 | 85 | 27.2 | 14.8 | 3.0 | 1.1 | 0.35 | 0.25 | 207 | 149 | 27 | 1.26 |
| 210 | 2.1 | 81 | 90 | 28.4 | 12.8 | 1.7 | 0.4 | 0.2 | 0.2 | 159 | 114 | 28.2 | 1.07 |
| 180 | 1.45 | 79 | 86 | 28.4 | 23.6 | 10.4 | 4.4 | 1.0 | 0.5 | 210 | 150 | 34.7 | 1.22 |
| 215 | 2.1 | 80 | 85 | 27.8 | 10.8 | 1.7 | 0.8 | 0.45 | 0.35 | 234 | 168 | 28.2 | 1.26 |
| 220 | 1.4 | 80 | 85 | 26.8 | 22.6 | 15.2 | 6.2 | 1.4 | 1.1 | 253 | 173 | 40.8 | 1.21 |

Purification was satisfactory also on heating to about 7° C. only generally equalling a consumption of about 230 cal./absorbed Nm.³ $CO_2$, moreover, the specific charge was a high one and it will be seen that it can be driven up to 40 Nm.³ $CO_2$/m.³ solution.

The results ascertained as above on experiments carried out on a semi-industrial scale were confirmed in actual practice of the method.

For instance in an industrial plant, in which the conventional diagram shown in FIGURE 2 was adopted and regeneration was effected by boiling the solution, 3,700 Nm.³/h. shift conversion gas compressed to 12 atm. containing 23.4% $CO_2$ are scrubbed by means of 30 m.³/h. arsenite solution containing 165 g./l. $K_2O$ and 110 g./l. $As_2O_3$. The scrubbed gas issues with a residual 0.05% $CO_2$ content, the solution receiving a specific charge of 29 Nm.³ $CO_2$/m.³.

In a further industrially operated plant the diagram shown in FIGURE 3 was adopted with regeneration by means of heated previously moistened air, as employed in the second set of experiments. According to this diagram the solution having absorbed $CO_2$ in the absorption tower 7 is heated in 8 by supply of external heat, preferably recovery heat of low thermal level, and is conveyed to the top of the regeneration columns 9 through which it travels and is regenerated, expelling $CO_2$ by a gaseous stream, usually air, introduced at the bottom. The regenerated solution issuing at 9 is taken by the pump 10 and directly returned to the absorption tower 7. The quantity and temperature of the desorbing gaseous stream and the size of the tower 9 are adjusted to cause the solution to simultaneously cool down to the absorption temperature. The air employed for regenerating the solution is taken from the atmosphere by means of the low pressure blower 11, preheated and premoistened in tower 12 by means of a hot watery liquid, usually water, it flows through the regeneration tower 9 and is conveyed together with the expelled $CO_2$ to the tower 13 in which it yields heat to a shower of said liquid and is finally discharged to the outside. The watery liquid which recovers heat in 13 and preheats and premoistens air in 12 is circulated by the pump 14. In the operating industrial plant the following conditions prevail: 5,730 Nm.³/h. converted gas, compressed to 12 atm. containing 33.2% $CO_2$ are scrubbed with 66 m.³/h. arsenite solution containing 217 g./l. $K_2O$ and 70 g./l. $As_2O_3$. The scrubbed gas issues with a 0.3% residual $CO_2$ content, the solution receiving a specific charge of 28.8 Nm.³/m.³ solution. In this case all the heat required for operation of the decarbonating process is supplied in the heat exchanger 8 by the gas itself flowing in a hot condition from the shift conversion plant. A consumption of 700 cal./m.³ absorbed $CO_2$ was ascertained.

In a further plant similarly operating with regeneration by means of air, distinguished by an exceptionally low operating pressure of 4.8 atm., the following conditions prevail: 12,000 Nm.³/h. gas containing 35% $CO_2$ are scrubbed by means of 370 m.³/h. arsenite solution containing 65 g./l. $Na_2O$ and 45 g./l. $As_2O_3$. The issuing scrubbed gas contains 0.4% $CO_2$ the solution receiving a specific charge of 11 Nm.³ $CO_2$/m.³.

The property of arsenite solutions of being easily regenerated even by treatment in direct contact with desorbing gases at relatively moderate industrially convenient temperatures below the boiling point at atmospheric pressure permits of advantageously modifying the conventional regeneration process by boiling and utilizing a novel mixed diagram including regeneration by boiling by heat and treatment by means of desorbing gases, and still further reducing the necessary heat quantity for operation of the cycle. Referring to FIGURE 2 this modification consists in substituting for the water cooler 5 a cooler employing a stream of air or other gases such that said cooling gaseous stream simultaneously effects desorbing thereby cooperating in pursuing and improving regeneration. This air cooler obviously operates mainly like the air regeneration tower 9 shown in FIGURE 3, so that the novel operational diagram is an advantageous combination of the diagrams shown in FIGURES 2 and 3. In this manner the regeneration tower effecting boiling of the solution is of smaller capacity and consumes less heat, said tower crudely expelling $CO_2$, the refrigeration-regeneration tower completing said regeneration by expelling the remaining absorbed $CO_2$.

This novel diagram has been employed in practice and operates in an industrial plant of a capacity of 3,400 Nm.³/h. gas at a pressure of 12 atm. The gas containing the 22% $CO_2$ is scrubbed down to 0.2% by means of 30 m.³/h. of an arsenite solution containing 174 g./l. $K_2O$ and 110 g./l. $As_2O_3$. During the first period of regeneration effected by boiling by means of steam 68% of the absorbed $CO_2$ is set free, the remaining 32% being expelled by treatment by means of an air stream which simultaneously cools the solution down to the absorption temperature.

The steam consumption for regeneration is reduced in this instance to about 60% of consumption in operation along the conventional diagram shown in FIGURE 2, in which regeneration is carried out entirely by boiling. The novel diagram can be employed also when the regeneration column has flowing thereto, instead of stripping stream from boiling of the solution itself, stream directly fed to the bottom from an external source. Under this new aspect the novel diagram has already been employed by an industrial plant in which the regeneration column has flowing therethrough pressure less steam from a synthetic ammonium sulphate plant.

The possibility of regenerating arsenite solutions by means of desorbing gases with a strongly reduced heat consumption permits of effecting by this method a purification from $CO_2$ which is very thorough indeed down to 20 parts per million employing to this end a two stage method, each stage separately comprising an absorption step and a regeneration step employing solutions of a suitable concentration. While the first stage crudely removes $CO_2$ by means of highly concentrated arsenite solutions, the latter stage carries out fine purification down to one part per million employing a more dilute solution of a lower $CO_2$ vapor pressure.

The first stage can employ the diagram including regeneration by boiling or the diagram including regeneration by air, as will be thought more convenient, the second stage employing regeneration by air which is sufficient for expelling small amounts of $CO_2$ without actually requiring any external heat.

The two stages method was employed in a large industrial plant treating 34,000 $Nm.^3$ gas at a pressure of 27 atm. containing 33.3% $CO_2$. The first stage employs an arsenite solution containing 200 g./l. $K_2O$ and 150 g./l. $As_2O_3$, the gas being purified down to a 2% $CO_2$ residual content. The second stage employs a more dilute solution containing 65 g./l. $K_2O$ and 58 g./l. $As_2O_3$, purification being driven beyond 0.02% residual $CO_2$. Since in this practical instance the regeneration towers operate both in the first and second stage by regeneration by air, said towers employ the same gaseous stream which flows in series through the towers.

Arsenite solutions possess a further property, which is of a fundamental importance in the industrial use of the improved method. It was found that expelling $CO_2$ from arsenite solutions utilized in industrial cycles takes place with great ease and speed when said $CO_2$ expulsion coincides with conversion of bicarbonate to carbonate, that is, when the $CO_2/M_2O$ molar ratio in the solution exceeds or equals 1. Subsequently when expulsion of $CO_2$ coincides with conversion of carbonate to arsenite, that is, when the above-mentioned ratio sinks from 1 to 0, said expulsion takes place more slowly so that, in actual practice, with the regeneration process by boiling and a supply of external heat of about 50 kg. steam/$m.^3$ solution, the $CO_2/M_2O$ molar ratio does not sink below 0.8–1, that is, the regenerated solution is composed as a maximum of 20% of the alkali combined as arsenite and 80% as carbonate. Expulsion of $CO_2$ beyond said limit meets with increasing difficulties, so that a boiling period prolonged at will at ordinary pressure will not lead to total $CO_2$ expulsion and total formation of arsenite, this purpose being attained only by prolonged treatment of the solution by means of desorbing gases at boiling temperature.

However, it has now been found that by boiling the solution instead of at atmospheric and super-atmospheric pressure, hence at high temperatures, $CO_2$ is expelled with greater ease and satisfactory results.

This behavior of the arsenite solutions may be explained by various assumptions by either admitting that acidity of arsenious anhydride increases with temperature, thereby chemically contributing to $CO_2$ expulsion or even admitting that the $CO_2$ vapor tension of the arsenite solutions is too low at the boiling temperature at atmospheric pressure to effect a substantial $CO_2$ expulsion, but rapidly increases with temperature, affording a conveniently industrial expulsion thereof. Apart from the above assumptions it is practically ascertained that a rise in pressure, hence in temperature furthers regeneration, against the common belief in the art according to which $CO_2$ expulsion would be facilitated by a sinking in pressure, generally by applying vacuum.

Evidence of the beneficial effect of the rise in regeneration temperature in operation at super-atmospheric pressure is derived from a comparison of the progress of regeneration with $CO_2$ expulsion from an arsenite solution by boiling at atmospheric pressure from the same arsenite solution by boiling at super-atmospheric pressure, as shown by the diagram in FIGURE 4.

To this end a watery arsenite solution was used containing 190 g./l. $K_2O$ and 113.1 g./l. $As_2O_3$ charged with carbon dioxide to a $Co_2/K_2O$ molar ratio of 1.33. This solution is heated to its boiling point to reproduce conditions of the regeneration step once at ordinary pressure and once at super-atmospheric pressure. The carbon dioxide and steam evolved on boiling are cooled in a cooler to condense and collect water, the measure of which is directly related to the steam quantity employed for regeneration. At given quantities of condensed water, practically at intervals of about 10% by volume of the liquid being tested, the liquid is analyzed in order to check progress of the removal of carbon dioxide. The results are set out in the diagram shown in FIGURE 4, in which the abscissae indicate by percentage of the quantity of liquid being examined the quantity of an evaporated water, that is, the heat introduced into the system, the ordinates indicating the carbon dioxide content of the solution expressed as a $CO_2/K_2O$ molar ratio.

The curve $a$ shows the progress of regeneration by boiling at atmospheric pressure, the curve $b$ showing the progress of regeneration carried out by the same equipment and under the same conditions to avoid any foreign influence, by boiling the solution at a temperature of 180° C. at the super-atmospheric pressure indicated near the curve.

The form of the curves $a$ and $b$ shows the difference in behavior of regeneration by boiling at ordinary pressure and regeneration by boiling at a temperature of 180° C. at super-atmospheric pressure.

It will be seen that the curve $a$ relating to regeneration at ordinary pressure is of an asymptotic character, denoting that even a prolonged treatment of the solution and very considerable heat consumption will not lead to the regeneration values attained by operation at 180° C. and super-atmospheric pressure (curve $c$) with ease and less heat consumption.

Regeneration of the arsenite solutions at superatmospheric pressure is advantageous in that the expelled $CO_2$ is collected under pressure, which is highly convenient when $CO_2$ is to be utilized in operations under pressure, such as manufacture of urea. The industrial use of such novel property of the arsenite solutions is generally effected along an operating diagram as shown by FIGURE 2, that is, chiefly along the conventional process of regeneration by boiling, with the modification that tower 3 for regeneration by boiling operates at super-atmospheric pressure, $CO_2$ being collected under pressure and the steam admitted into the coil 4 being at a necessary pressure for bringing the solution to boiling temperature under said novel operating conditions. It is pointed out that the pump 6 may simply be a circulating pump when equal absorption and regeneration pressures are selected. Alternatively, the solution may be regenerated at a higher pressure than the absorption pressure; in such a case the pump will act to convey the solution from the absorption step (lower pressure) to the regeneration step (higher pressure).

In order to industrially demonstrate the convenience of regenerating arsenite at super-atmospheric pressure a semi-industrial plant was employed, comprising an absorption tower 0.4 m. in diameter and 15 m. in useful height fed with a gaseous mixture of 300 $Nm.^3/h.$ gas at a pressure of 11 atm. gage and a 17.8% $CO_2$ content. Regeneration of the solution was effected at first in a tower operating at atmospheric pressure, 0.6 in diameter and 15 m. in useful height, next at a pressure of 5 and 8 atm. gage in a smaller tower 0.4 m. in diameter and 6 m. in height. The solution employed for the cycle was of the following composition: $K_2O=200$ g./l. and $$As_2O_3=140 \text{ g./l.}$$

The quantity of steam fed to the regeneration towers was kept constant during all the experiments.

The results are set out in Table 6 as follows:

Table 6

| Regeneration pressure effective atm. | CO₂ content in gas, percent by volume | | CO₂/K₂O molar ratio in the regenerated solution | Steam consumed by regeneration, kg./h. | Temperatures, °C., of the solution | | |
|---|---|---|---|---|---|---|---|
| | Inlet | Outlet | | | Absorption | Regeneration | |
| | | | | | | Inlet | Outlet |
| 0 | 17.8 | 0.2 | 1.06 | 100 | 66 | 95 | 104 |
| 5 | 17.8 | 0.1 | 0.97 | 100 | 66 | 160 | 168 |
| 8 | 17.8 | 0.05 | 0.93 | 100 | 66 | 170 | 180 |

The tests show that the extent of regeneration of the solution expressed as a CO₂/K₂O molar ratio is improved with a slight corresponding improvement in the extent of CO₂ purification. However, it was fundamentally ascertained that regeneration at super-atmospheric pressure consumes the same heat quantity as at atmospheric pressure, though the former yields CO₂ in compressed state.

The possibility of regenerating the solutions at high temperatures corresponding to operation at super-atmospheric pressure of the regeneration step correspondingly also increases the temperature of the absorption step. It was previously explained that arsenite solutions afford fine, at any rate conveniently industrial purification from CO₂ at boiling temperatures at atmospheric pressure, more effectively than was heretofore possible by using other absorbing solutions employed by industry.

It is now found that a temperature of the absorption step can still be further increased, no limitation being imposed but for the requirement of a difference in temperature in the two steps such that CO₂ bound on the absorption step is expelled on the regeneration step. So, for instance, the possibility of regenerating at 180° C. permits of carrying out purification of gaseous mixtures at 120–130° C., without such values representing a limitation in the use of such possibility.

In industrial use of the improved method two drawbacks were ascertained, which were obviated by the remedies described hereafter.

The former drawback resides in the fact that arsenious anhydride slowly oxidizes forming arsenate by the action of any oxygen contained in the gaseous mixture to be purified, more particularly by air when the latter is employed for regeneration.

I ascertained that conversion of arsenious anhydride (arsenite) to arsenate besides decreasing the arsenious anhydride concentration, which is the active compound in the improved process, objectionably affects effectiveness of the absorbing solutions also owing to the presence of arsenate, probably on account of the buffer action on the latter. It has been found that the objectionable effect of the presence of arsenate appears when the concentration of the latter expressed as As₂O₃ exceeds 30–50 g./l. So, for instance, it was found, that a solution of sodium arsenite containing 23 g./l. Na₂O, 75 g./l. As₂O₃ as well as 29 g./l. arsenate (expressed as As₂O₃) scrubs at atmospheric pressure a gas from 19.6% CO₂ down to 1.9%, while with an arsenate content of 79 g./l. (expressed as As₂O₃) CO₂ on issue from the scrubbing process rises to 6.4%. A solution of potassium arsenite containing 210 g./l. K₂O and 150 g./l. As₂O₃, as well as 30 g./l. arsenate (expressed as As₂O₃) at a pressure of 12 atm. a gas from 20% CO₂ down to 0.2% CO₂, while with an arsenate content of 76 g./l. (as As₂O₃) CO₂ on issue rises to 1.2%.

The drawback deriving from oxidation of arsenite to arsenate, the increasing accumulation of which in the absorbing solutions is apt with time to detrimentally affect the satisfactory method of the process, was obviated by a special process which constantly converts arsenate back to arsenite. The method consists in drawing from the solution circulating in the plant a portion thereof admixing it with a reducing substance and heating to a temperature of over 150° C., preferably ranging between 250° C. and 280° C. in a container adapted to withstand the pressure corresponding to the selected temperature.

Probably the influence of such high temperatures increases the oxidizing power of arsenate so that a generally reducing substance is capable of reducing it to arsenite. For it was ascertained that reducing substances of any class or kind fulfil the above purpose, reaction starting at 150° C. and becoming sharply industrial over 220° C. At still higher temperatures, more particularly between 250 and 280° C., reduction of arsenate takes place with increased ease. The nature of the reducing substance is not therefore essential to the process which chiefly depends upon temperature. It was ascertained that reducing substances useful for the purpose are for instance formic acid, oxalic acid, tartaric acid, organic acids generally, salts and derivatives thereof or chemical compounds originating such acids, formaldehde and aldehydes, methyl, ethyl and other alcohols, hydrazine and salts thereof, hydrosulphite, sulphides, metals in the free state such as arsenic, bismuth and antimony, moreover hydrocyanic acid, cyanides and ferro-cyanides.

Among the above recited substances preference should be given to such which do not contaminate the absorbing solution by foreign compounds, which accumulating in the solution would ultimately necessitate purification of the solution from said foreign substances.

For instance formic acid is preferred, which reduces arsenate to arsenite decomposing in water and carbon dioxide by a reaction of the type:

$$As_2O_5 + 2HCOOH = As_2O_3 + 2CO_2 + 2H_2O$$

or oxalic acid which reacts by a reaction of the type: 
$As_2O_5 + 2(COOH)_2 = As_2O_3 + 4CO_2 + 2H_2O$. As a matter of fact it was ascertained that the reducing treatment of arsenate at high temperature should preferably be carried out by means of CO₂ rich solutions, such as those from the absorption step. It was moreover ascertained that operation should preferably be carried out in an autoclave equipped with stirring means, for stirring improves the reducing process. This may be explained by considering that during the early part of the reduction, the latter may proceed till formation of arsenic metal which, however, acts in turn as a reducing agent by being reabsorbed by the solution by a reaction of the type: $3As_2O_5 + 4As = 5As_2O_3$. Obviously this reaction is improved by stirring which makes contact more thorough.

At the high temperature at which treatment is effected the material of which the pressure container is made undergoes corrosion due to the simultaneous action of alkali and arsenite, so that it is not possible to use either ordinary steel or stainless nickel chrome steels. However, it was found that the use of the noble metals is exempt from any drawback. Among said noble metals, silver appears to be preferable and may be employed for lining the autoclave.

Reduction of arsenate to arsenite occurs even when temperatures exceeding 150° C. are attained in a dry condition, that is in a solid phase. In this case the solution containing the arsenate to be reduced admixed with a reducing agent is concentrated to dryness, the saline residue is heated at ordinary pressure to a temperature exceeding 150° C, preferably higher in a surrounding of an inert non-oxidizing gas, such as, for instance, nitrogen or carbon dioxide. After this treatment the saline residue is redissolved and utilized.

Reduction of arsenate to arsenite will be illustrated by the following two examples which are limited for the sake of simplicity to the use of formic acid, but apply to any other reducing agent.

An arseniate solution employed for absorbing $CO_2$ containing 193 g./l. $K_2O$ and 121 g./l. $As_2O_3$ as well as 45 g./l. arsenate expressed as $As_2O_3$ is admixed with formic acid by an extent of 21 g./l. and heated in an autoclave to a temperature of 235° C. at a pressure of about 30 kg./sq. cm. On completion of the treatment the arsenite content has risen to 162 g./l. expressed as $As_2O_3$, the arsenate content having sunk to 4 g./l. expressed as $As_2O_3$.

As an example of reducing at dryness, an arsenite solution containing 191 g./l. $K_2O$ and 126 g./l. $As_2O_3$ as well as 49 g./l. arsenate expressed as $As_2O_3$ admixed with 23 g./l. formic acid is evaporated by boiling at atmospheric pressure to dryness; the saline residues are heated to a temperature of 220° C. in a surrounding of $CO_2$ at atmospheric pressure and kept at such temperatures for 30 minutes. The salts redissolved to their initial volume show that the arsenate content has sunk to 12 g./l.

In the industrial plant 12,000 $Nm.^3$/h. gas at a pressure of 4.8 atm. in which regeneration is effected by blowing in air, as described above, the formation of about 60 kg. arsenate daily was ascertained. In order to maintain the arsenate concentration at a harmless value of about 30 g./l. (expressed as $As_2O_3$) 4 $m.^3$ solution daily are continuously drawn from the plant, the arsenate therein being removed by treatment in an autoclave at 250° C. with a daily consumption of about 30 kg. formic acid.

The latter drawback derives from the fact that the gaseous mixtures to be purified very often contain in addition to $CO_2$, $H_2S$ impurities and the arsenious anhydride contained in the absorbing solutions of my method have been found to quantitively absorb $H_2S$ by binding it as arsenic sulphide which, as distinct from arsenious anhydride, is a compound which does not activate $CO_2$ absorption.

A preparatory removal of the $H_2S$ contained in the gaseous mixtures to be purified is therefore required to prevent the absorbing solutions from rapidly becoming ineffective. Moreover, formation of the arsenic sulphide is non-reversible, that is, reconversion of arsenic sulphide to $As_2O_3$ with $H_2S$ expulsion is not possible, so that the $CO_2$ expelled and recovered at the regeneration step is constantly fully free from $H_2S$. Simultaneous removal of $CO_2$ and $H_2S$ by means of solutions containing arsenious anhydride is carried out by a method disclosed by copending application Serial No. 594,775 filed June 29, 1956, now Patent No. 2,943,910. However, should preliminary removal of $H_2S$ from the gaseous mixtures as mentioned above not be complete or should any $H_2S$ accidentally gain access to the $CO_2$ purification cycle, the resulting difficulty is removed by the specially developed process consisting in drawing a small portion of the solution from the cycle, admixing it with a preferably alkaline cyanide, heating, if necessary, for a certain time at 60° C. and returning the solution thus treated to the cycle. For it was ascertained that $H_2S$ together with arsenious anhydride and arsenate, which is always contained in the solution, is converted to monothioarsenate $M_5AsO_3S$ which reacts with cyanide by a reaction of the type $M_3AsO_3S + MCN = M_3AsO_3 + MCNS$ which re-establishes arsenite, sulphur being bound as sulphur cyanide which is an indifferent compound in respect of $CO_2$ absorption.

A further process for removing any sulphur contaminating the solution consists in treating the latter by means of metal salts leading to the formation of an insoluble sulphide such as lead, zinc, cadmium. For instance, a solution employed for absorbing $CO_2$ and contaminated by about 0.1–0.2 g./l. sulphur, is admixed with lead carbonate and heated to about 60–70° C. Sulphur precipitates as lead sulphide, which is removed by filtering.

The symbol $Nm.^3$ used throughout the specification stands for Normal cubic meter, that is for cubic meter of the gaseous fluid concerned when measured under standard temperature and pressure conditions.

What I claim is:

1. In a method of removing and recovering carbon dioxide from gaseous mixtures containing it, employing an absorbing aqueous solution of an absorbent consisting essentially of a member of the group consisting of the carbonates, borates, phosphates, and phenolates of an alkaline component of the group consisting of the alkali metals and ammonia, which is cycled between an absorption step in which the solution is contacted with the gaseous mixture to be purified to absorb carbon dioxide, and a regeneration step in which said solution having absorbed carbon dioxide is regenerated by removal of the latter, the improvement which comprises providing arsenious anhydride in said aqueous solution and maintaining said arsenious anhydride as the activator agent for the absorption step and for the regeneration step continuously throughout said absorption step and said regeneration step, said arsenious anhydride being maintained as such under the conditions prevailing in said absorption step and said regeneration step by decomposing arsenate, sulphuretted arsenical compounds and like arsenic compounds inoperative in $CO_2$ absorption and tending to form in said solution during said removing and recovering of carbon dioxide.

2. In a method of removing and recovering carbon dioxide from gaseous mixtures containing it, employing an absorbing aqueous solution consisting essentially of a member of the group consisting of the carbonates, borates, phosphates, and phenolates of an alkaline component of the group consisting of the alkali metals and ammonia, which is cycled between an absorption step in which the solution is contacted with the gaseous mixture to be purified to absorb carbon dioxide, and a regeneration step in which said solution having absorbed carbon dioxide, is regenerated by removal of the latter, the improvement which comprises providing arsenious anhydride in the aqueous solution and maintaining said arsenious anhydride as the activator agent for the absorption step and for the regeneration step continuously throughout said absorption step and said regeneration step, said arsenious anhydride being maintained as such under the conditions prevailing in said absorption step and said regeneration step by decomposing arsenate, sulphuretted arsenical compounds and like arsenic compounds inoperative in $CO_2$ absorption and tending to form in said solution during said removing and recovering of carbon dioxide, said arsenious anhydride being contained in the cycling absorbing solution in a quantity ranging between 0.6 gram and 200 grams per liter of solution.

3. In a method of removing and recovering carbon dioxide from gaseous mixtures containing it, employing an absorbing aqueous solution consisting essentially of a member of the group consisting of the carbonates, borates, phosphates, and phenolates of an alkaline component of the group consisting of the alkali metals and ammonia, which is cycled between an absorption step in which the solution is contacted with the gaseous mixture to be purified to absorb carbon dioxide, and a regeneration step in which said solution having absorbed carbon dioxide, is regenerated by removal of the latter, the improvement which comprises providing arsenious anhydride in the aqueous solution and maintaining said arsenious anhydride as the activator agent for the absorption step and for the regeneration step continuously throughout said absorption step and said regeneration step, said arsenious anhydride being maintained as such under the conditions prevailing in said absorption step and said regeneration step by decomposing arsenate, sulphuretted arsenical compounds and like arsenic compounds inoperative in $CO_2$ absorption and tending to form in said solution during said removing and recovering of carbon dioxide, said arsenious anhydride being contained in the cycling absorbing solution in a quantity ranging between 1 gram of arsenious anhydride per liter of solution and a concentration such as to correspond, with the alkaline component in the solution, to the stoichiometrical proportion for forming orthoarsenite $M_3AsO_3$, wherein M is the alkaline component.

4. In a method of removing and recovering carbon dioxide from gaseous mixtures containing it, employing an absorbing aqueous solution consisting essentially of a member of the group consisting of the carbonates, borates, phosphates, and phenolates of an alkaline component selected from the group consisting of the alkali metals and ammonia, wherein arsenious anhydride is present and is maintained as such as the activator agent continuously at all times, and comprising the steps of contacting said gaseous mixture in an absorption zone with the absorbing solution to absorb carbon dioxide, removing from the absorption zone the absorbing solution charged with carbon dioxide and conveying it to a regeneration zone, the improvement which comprises effecting regeneration at a lower temperature than the boiling point at atmospheric pressure of the solution to be regenerated and expelling carbon dioxide from the solution by treatment of the latter in direct contact with air effective to remove said carbon dioxide from said solution.

5. A method as defined in claim 4, wherein the desorbing gas employed for regeneration of the solution is pre-heated and pre-moistened by means of an aqueous liquid cycling between a zone in which it is heated and recovers the heat contained in the carbon dioxide-containing hot gaseous fluid issuing from the regeneration step, and a zone in which it is cooled and pre-moistens and pre-heats the gaseous fluid which is admitted to the regeneration zone.

6. In a method of removing and recovering carbon dioxide from gaseous mixtures containing it, employing an absorbing aqueous solution consisting essentially of a member of the group consisting of the carbonates, borates, phosphates, and phenolates of an alkaline component selected from the group consisting of the alkali metals and ammonia, wherein arsenious anhydride is present and is maintained as such as the activator agent continuously at all times, and comprising the steps of contacting said gaseous mixture in an absorption zone with the absorbing solution to absorb carbon dioxide, removing from the absorption zone the absorbing solution which has become charged with carbon dioxide, and conveying it to a regeneration zone in which the carbon dioxide is expelled from the solution by boiling the latter at atmospheric pressure, and removing the regenerated solution from said regeneration zone, the improvement which comprises transferring the solution removed from the regeneration zone to a cooling zone in which the solution is treated in direct contact with an inert gas, which, as it cools the solution, expels a further quantity of carbon dioxide, thereby further regenerating said solution.

7. In a method of removing and recovering carbon dioxide from gaseous mixtures containing it, employing an absorbing aqueous solution consisting essentially of a member of the group consisting of the carbonates, borates, phosphates, and phenolates of an alkaline component selected from the group consisting of the alkali metals and ammonia, wherein arsenious anhydride is present and is maintained as such as the activator agent continuously at all times, and comprising the steps of contacting said gaseous mixture in an absorption zone with the absorbing solution to absorb carbon dioxide, removing from the absorption zone the absorbing solution which has become charged with carbon dioxide, and conveying it to a regeneration zone, the improvement which comprises carrying out the regeneration of the solution at a pressure above atmospheric pressure.

8. In a method of removing and recovering carbon dioxide from gaseous mixtures containing it, employing an absorbing aqueous solution consisting essentially of a member of the group consisting of the carbonates, borates, phosphates, and phenolates of a member of the group consisting of the alkali metals and ammonia wherein arsenious anhydride is present and is maintained as such as the activator agent continuously at all times, wherein by continuously cycling between an absorption step and a regeneration step the absorbing solution becomes enriched with alkali arsenate, which is ineffective for absorbing carbon dioxide by the oxidation of arsenious anhydride, the improvement which comprises drawing part of said solution containing alkali arsenate and introducing it admixed with a reducing agent effective to reduce said alkali arsenate and selected from the group consisting of formaldehyde, formic acid, oxalic acid, and tartaric acid, hydrazine, hydrosulphides, arsenic, bismuth, and antimony, methyl alcohol, ethyl alcohol, hydrocyanic acid, cyanides and ferrocyanides, into a pressure zone wherein it is heated to a temperature above 150° C., for converting the alkali arsenate to arsenious anhydride in the alkaline environment of the solution itself, withdrawing the part of the solution freed from arsenate and again adding it to the solution from which said part of the solution was withdrawn.

9. In a method of removing and recovering carbon dioxide from gaseous mixtures containing it, employing an absorbing aqueous solution consisting essentially of a member of the group consisting of the carbonates, borates, phosphates, and phenolates of a member of the group consisting of the alkali metals and ammonia wherein arsenious anhydride is present and is maintained as such as the activator agent continuously at all times, wherein by continuously cycling between an absorption step and a regeneration step the absorbing solution becomes enriched with alkali arsenate, which is ineffective for absorbing carbon dioxide by the oxidation of arsenious anhydride, the improvement which comprises drawing part of said solution containing alkali arsenate and introducing it admixed with a reducing agent effective to reduce said alkali arsenate into a pressure zone wherein it is heated to a temperature of 250–280° C., for converting the alkali arsenate to arsenious anhydride in the alkaline environment of the solution itself, withdrawing the part of the solution freed from arsenate and again adding it to the solution from which said part of the solution was withdrawn.

10. In a process as defined in claim 8, wherein said pressure zone is defined by a container interiorly lined with silver.

11. In a method of removing and recovering carbon dioxide from gaseous mixtures containing it, employing an absorbing aqueous solution consisting essentially of a member of the group consisting of the carbonates, borates, phosphates, and phenolates of a member of the group consisting of the alkali metals and ammonia wherein arsenious anhydride is present and is maintained as such as the activator agent continuously at all times, wherein by continuously cycling between an absorption step and a regeneration step the solution becomes contaminated with sulphuretted arsenical compounds, which are ineffective for absorbing carbon dioxide, formed by the reaction of sulphuretted hydrogen contained in the gaseous mixture to be decarbonated with the arsenious anhydride in the absorbing solution, the improvement which comprises drawing off part of said solution containing the sulphuretted arsenical compounds and decomposing them by the addition of alkali metal cyanides to form sulphocyanides and to regenerate arsenious anhydride, said solution being at a temperature of at least about 60° C., and admixing the thus-purified solution with the solution from which said part of the solution was withdrawn.

References Cited in the file of this patent

UNITED STATES PATENTS

| | | |
|---|---|---|
| 1,934,472 | Allen et al. | Nov. 7, 1933 |
| 1,990,217 | Baehr et al. | Feb. 5, 1935 |
| 2,031,632 | Bottoms | Feb. 25, 1936 |
| 2,164,194 | Millar et al. | June 27, 1939 |
| 2,840,450 | Giammarco | June 24, 1958 |

FOREIGN PATENTS

| | | |
|---|---|---|
| 286,633 | Great Britain | Oct. 16, 1928 |